(12) United States Patent
Tajima

(10) Patent No.: US 6,208,402 B1
(45) Date of Patent: Mar. 27, 2001

(54) ANTIFERROELECTRIC LIQUID CRYSTAL PANEL

(75) Inventor: Eiichi Tajima, Iruma (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/153,301

(22) Filed: Sep. 15, 1998

(30) Foreign Application Priority Data

Sep. 17, 1997 (JP) ................................................ 9-252251

(51) Int. Cl.$^7$ .......................... G02F 1/1339; G09K 19/02
(52) U.S. Cl. ............................................ 349/156; 349/174
(58) Field of Search ................................. 349/155, 156, 349/157, 174, 122

(56) References Cited

U.S. PATENT DOCUMENTS

| | | | |
|---|---|---|---|
| 4,367,924 | 1/1983 | Clark et al. ........................ | 350/334 |
| 5,719,653 | * 2/1998 | Minato et al. ..................... | 349/156 |
| 5,784,140 | * 7/1998 | Lee ................................... | 349/174 |
| 5,828,434 | * 10/1998 | Koden et al. ...................... | 349/156 |
| 5,880,803 | * 3/1999 | Tamai et al. ...................... | 349/156 |

FOREIGN PATENT DOCUMENTS

| | | |
|---|---|---|
| 56-107216 | 8/1981 | (JP) . |
| 2-173724 | 7/1990 | (JP) . |

* cited by examiner

*Primary Examiner*—Kenneth Parker
(74) *Attorney, Agent, or Firm*—Armstrong, Westerman, Hattori, McLeland & Naughton, LLP

(57) ABSTRACT

In an antiferroelectric liquid crystal panel, in which a plurality of strip-shaped first and second transparent electrodes are formed on a pair of first and second substrates, the substrates are opposedly disposed so that the transparent electrodes intersect with each other at right angles, and the antiferroelectric liquid crystal is filled in a gap thereinbetween, at least at the positions corresponding to intersecting portions of the gaps between a plurality of first transparent electrodes and the gaps between a plurality of second transparent electrodes. Spacers are fixed on the first substrate and made of insulating material, a first alignment layer is formed to cover at least the first transparent electrodes on the first substrate, and a second alignment layer is formed to cover the second transparent electrodes on the second substrate.

21 Claims, 6 Drawing Sheets

ANTIFERROELECTRIC LIQUID CRYSTAL PANEL

BACKGROUND OF THE INVENTION

1. Field of the Invention The present invention relates to an antiferroelectric liquid crystal panel which is a kind of liquid crystal panel used for a display device or a light shutter.

2. Description of the Related Art

Since a liquid crystal display device using an antiferroelectric liquid crystal panel has characteristics of faster response speed and a wider viewing angle compared with a conventional nematic liquid crystal panel, future growth is expected.

The antiferroelectric liquid crystal has the same smectic layer structure as a ferroelectric liquid crystal. In a liquid crystal cell where a cell gap between substrates filled with the antiferroelectric liquid crystal is made 1 to 3 $\mu$m, and the liquid crystal molecules are aligned to be parallel to the substrate surface, a switching phenomenon caused by electric field induction is created.

That is, when voltage is not applied, each long axis of the liquid crystal molecules tilts at a predetermined angle to the normal of the layer in the opposite direction to each other, and the directions of the spontaneous polarization created in the direction intersecting at right angles to the long axis of the molecule form an alternate alignment structure facing upward and downward for every layer to make an antiferroelectric liquid crystal panel, and the entire cell becomes an antiferroelectric layer having zero spontaneous polarization.

On the other hand, when a voltage is applied, each liquid crystal molecule turns in a manner that the spontaneous polarization of the liquid crystal molecule aligns in a direction coinciding with an electric field direction caused by the applied voltage and produces a ferroelectric layer whose molecules all tilt in the same direction with respect to the normal direction of the smectic layer. The direction in which the liquid crystal molecules tilt at this moment depends on the polarity of the applied voltage.

A liquid crystal display panel or a liquid crystal shutter can be structured utilizing the switching phenomenon in a layer state caused by the electric field induction of the above-described antiferroelectric liquid crystal, varying a polarization state of transmitted light, and controlling the amount of light transmitted by combining a polarizing film.

Here, a structure of the conventional antiferroelectric liquid crystal panel is explained with reference to a sectional view in FIG. 13.

The antiferroelectric liquid crystal panel 100 has a first substrate 101 and a second substrate 102 which are made of a glass plate, opposedly disposed, and the antiferroelectric liquid crystal 103 is filled in the gap between the substrates.

On each confronting surface of the first substrate 101 and the second substrate 102, a number of strip-shaped transparent electrodes 105 and 106 are aligned to intersect with each other at approximately right angles. Alignment layers 107 and 108 coated with resin film made of polyimide or polyamic acid are formed to cover each transparent electrode 105 and 106, and an aligning treatment performed by a rubbing is applied on each surface.

In order to keep the gap between the first substrate 101 and the second substrate 102 constant, silica beads 109 having a diameter in the range of about 1.5 $\mu$m to 1.7 $\mu$m are scattered as a spacer between both substrates. The silica beads 109 are scattered at a density in the range of 500 beads/mm$^2$ to 1000 beads/mm$^2$ to make the cell gap uniform.

A seal material 110 is formed on the second substrate 102 with a thermosetting adhesive. The first substrate 101 and the second substrate 102 are placed one upon another with correct positioning and by bonding each other with the sealing agent 110, the gap in which the antiferroelectric liquid crystal 103 is filled, is sealed.

The seal material 110 is a thermosetting adhesive patterned along the periphery of the second substrate 102. After placing the first substrate 101 on the second substrate 102 and bonding each to the other, the seal material 110 is hardened by a heating through applying pressure of 1.0 to 2.0 kg/cm$^2$ and a temperature in the range of 120° C. to 160° C. for one to two hours in an oven.

On the outside of the first substrate 101 and the second substrate 102 of the antiferroelectric liquid crystal panel 100 thus formed, polarizer 111 and 112 are arranged in a manner that each polarization axis intersects at right angles with the other to form a liquid crystal display panel.

In the above-described antiferroelectric liquid crystal panel 100, the presence or absence of the voltage applied on the antiferroelectric liquid crystal can be controlled at each intersecting portion of the first transparent electrode 105 and the second transparent electrode 106, so that an antiferroelectric state and a ferroelectric state of the antiferroelectric liquid crystal are selectively created so as to partially modify the polarization state of light passing through the antiferroelectric liquid crystal panel 100.

Then by disposing a pair of polarizers 111 and 112, of which polarization axes intersect with each other at right angles, on both sides of the antiferroelectric liquid crystal panel 100, various displays can be conducted by controlling the amount of light transmitted at each display pixel, which are the intersecting portions of the first transparent electrode 105 and the second transparent electrode 106.

In such an antiferroelectric liquid crystal panel, the gap between the first substrate 101 and the second substrate 102 is smaller than that of the liquid crystal display panel using a conventional twisted nematic liquid crystal, and is preferably 2 $\mu$m or less. Therefore, a silica bead 109 having a diameter in the range of 1.5 $\mu$m to 1.7 $\mu$m as described above is used as a spacer to keep the gap constant. However, it has such disadvantages as follows.

That is, in a liquid crystal display panel which is made by bonding two sheets of polarizers 111 and 112 on the outer surfaces of the first and second substrates 101 and 102 of the antiferroelectric liquid crystal panel 100 shown in FIG. 13, the silica beads 109 are unavoidably scattered on a display pixel portion (an intersecting portion of the first transparent electrode 105 and the second transparent portion 106). Accordingly, there arises a disadvantage that a void is created due to the restriction on the movement of the liquid crystal molecules by the silica beads 109, or a delicate void transmission of light is created due to the diffracted light around the silica bead.

When the antiferroelectric liquid crystal panel is formed by placing the first substrate 101 upon the second substrate 102, since some shear stress occurs during a positioning process, the silica beads are slightly shifted to create an alignment defect on the alignment layers 107 and 108, and there arises another disadvantage of the lowering of the black level when no voltage is applied.

These disadvantages result in not only lowering the contrast of the liquid crystal display panel using the antiferroelectric liquid crystal panel, but also creating a disadvantage of lowering the reliability in quality due to the alignment failure caused by damaging the alignment layer.

In the case of the antiferroelectric liquid crystal panel, since the gap between the substrates is a narrow gap of less than 2 μm, both substrates slightly vibrate, resonating with the driving frequency of the voltage applied to the antiferroelectric liquid crystal. Since the alignment layer is damaged due to shifting of the silica beads caused by the vibration, there arises still another disadvantage of the aligning force being gradually lowered.

Further, in the antiferroelectric liquid crystal panel, when the liquid crystal display panel is formed by bonding the polarizers 111 and 112 on both sides of the first substrate 101 and the second substrate 102 shown in FIG. 13, since a pressure of more than 5 to 30 g/cm$^2$ is applied, it is possible to cause damage to a regularly aligned layer structure which is a characteristic of the antiferroelectric liquid crystal molecules due to the applied vertical pressure. This also creates an alignment defect, which results in yet another disadvantage of deterioration in the display quality.

Therefore, the conventional antiferroelectric liquid crystal panel has a disadvantage that it not only requires special equipment for bonding the polarizer film so as not to damage the layer structure, but also it can not be used for a touch panel to enable pen input to a computer from the upper surface of the panel.

SUMMARY OF THE INVENTION

An object of the present invention is to obtain a high quality display panel with high reliability when used as a liquid crystal panel, solving the above-described disadvantages, making it possible to keep a narrow gap distance constant between a pair of substrates sandwiching an antiferroelectric liquid crystal, avoiding the possibility of creating alignment defects caused by damaging an alignment layer, and to make it usable in a normal manner without damaging the layer structure of the antiferroelectric liquid crystal when some pressure is applied on the panel surface.

The antiferroelectric liquid crystal panel according to the present invention is structured as follows to achieve the above objects.

In the antiferroelectric liquid crystal panel, a first substrate, formed with a plurality of strip-shaped first transparent electrodes, and a second substrate, formed with a plurality of strip-shaped second transparent electrodes, are opposedly disposed in a manner such that the first transparent electrodes and the second transparent electrodes intersect with each other at substantially right angles with a small gap, and the antiferroelectric liquid crystal is filled therein, and the following spacers and alignment layers are provided.

That is, spacers made from an insulating material are fixed on the first substrate at the positions corresponding to at least the intersecting portions of first spaces between plural first transparent electrodes and second spaces between plural second transparent electrodes.

A first alignment layer is formed on the first substrate so as to cover at least the first transparent electrodes and a second alignment layer is formed on the second substrate so as to cover the second transparent electrodes.

The first alignment layer can be formed on the surface of the spacers and the above-described spacers can be easily formed with a photosensitive resin.

The silica beads with adhesive are adhered to the spacers, and the spacers and the second substrate can be firmly bonded by the adhesive.

The above-described spacer can be placed on a corresponding position with respect to the intersecting portion of the first space between the first transparent electrodes and the second space between the second transparent electrodes, and preferably has a cross-shaped plane formed with the intersecting longer side and shorter side.

In such a case, it is desirable that the first alignment layer and the second alignment layer are subjected to an alignment treatment in a substantially parallel direction to either the longer side portion or the shorter side portion of the cross-shaped spacer.

The above spacer can be scattered on spots corresponding to each gap including at least the intersecting portion of the first space between the first transparent electrodes and the second space between the second transparent electrodes.

The above and other objects, features and advantages of the invention will be apparent from the following detailed description which is to be read in conjunction with the accompanying drawings.

DETAILED DESCRIPTION OF THE PREFERRED EMBODIMENTS

The best suited embodiment to carry out an antiferroelectric liquid crystal panel according to the present invention will be explained below in detail with reference to the drawings.

First Embodiment: FIG. 1, FIG. 5 to FIG. 8

Figure 1:
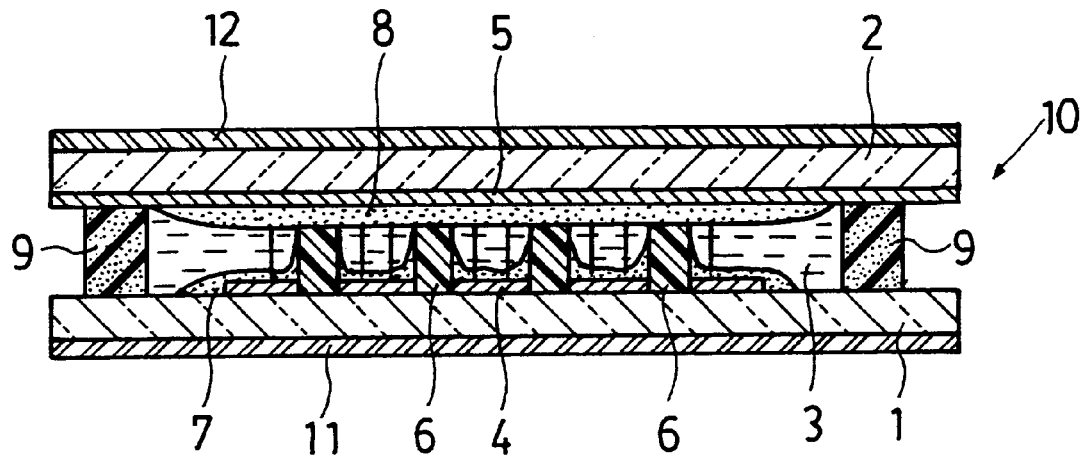
FIG. 1 to FIG. 4 are schematic sectional views showing the structure of a first to fourth embodiment of an antiferroelectric liquid crystal panel according to the present invention.

FIG. 1 is a sectional view showing the first embodiment of an antiferroelectric liquid crystal panel of the present invention. Incidentally FIG. 1 as well as FIG. 2 to FIG. 4, which are used to explain another embodiment, shows in an extensively enlarged size ratios in the thickness direction of the panel for the convenience of the drawings.

The antiferroelectric liquid crystal panel 10 is formed with a first substrate 1 and a second substrate 2 which are opposedly disposed and are made of glass plates, and an antiferroelectric liquid crystal 3 is filled in a gap therebetween.

On each of the opposing surfaces of the first substrate 1 and the second substrate 2, a plurality of strip-shaped first transparent electrodes 4 and second transparent electrodes 5 made of indium tin oxide (ITO) film each having a thickness of about 0.25 µm are aligned in directions intersecting at substantially right angles.

In FIG. 1, the plural first transparent electrodes 4 on the first substrate 1 are in line in a direction parallel to the plane of the drawing at predetermined intervals, and are formed in a strip shape in a direction perpendicular to the plane of the drawing. The plural second transparent electrodes 5 on the second substrate 2 are in line in a direction perpendicular to the plane of the drawing at predetermined intervals, and are formed in a strip shape in a direction parallel to the plane of the drawing.

Figure 5:
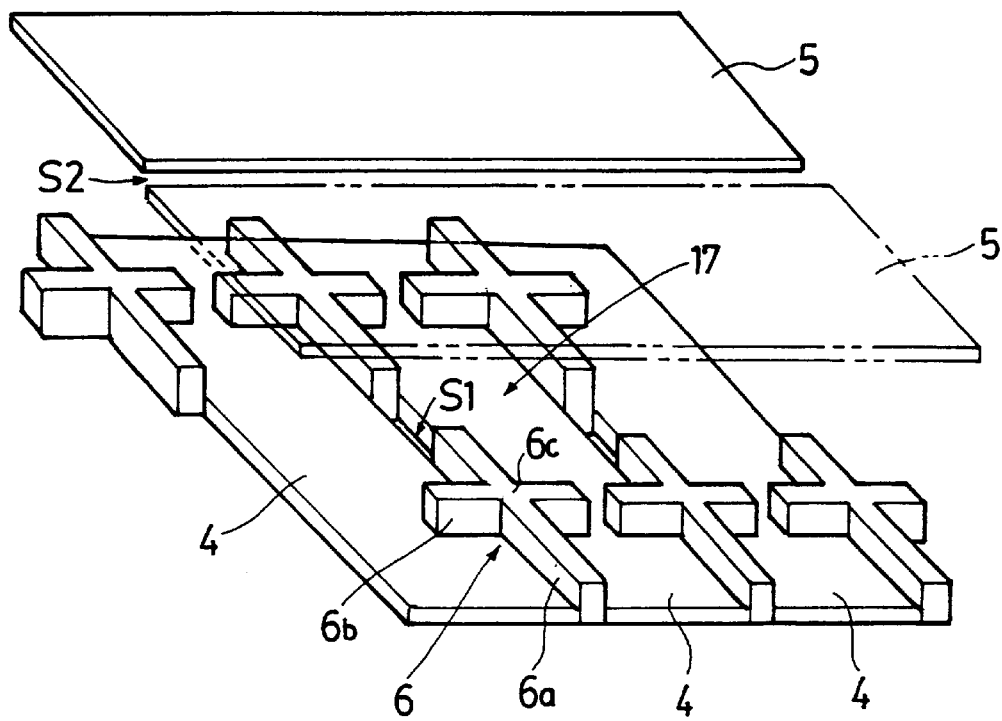
FIG. 5 is a partially enlarged perspective view showing the layout of the first transparent electrodes 4 and the second transparent electrodes 5 and cross-shaped spacers 6 shown in FIG. 1.

Spacers 6 which are made of photoresist and have a cross-shaped plane surface are fixed on an inner surface of the first substrate 1 shown in FIG. 5 at the positions corresponding to the intersecting portions of the spaces between the plural first transparent electrodes 4 and the spaces between the plural second transparent electrodes 5. The spacers 6 will be described in detail later.

A first alignment layer 7 is formed on the inner surface of the first substrate 1 to cover the first transparent electrodes 4 and the spacers 6, and a second alignment layer 8 is formed on the inner surface of the second substrate 2 to cover the second transparent electrodes 5. The alignment layers 7 and 8 will be described in detail later.

A sealing agent 9 is patterned on the inner surface of the second substrate 2, and the first substrate 1 and the second substrate 2 are correctly placed one on top of the other. By bonding the substrates with the sealing agent 9, the gap to be filled with the antiferroelectric liquid crystal 3 is sealed.

The sealing agent 9 is a thermosetting adhesive or an ultraviolet rays hardening adhesive patterned along the periphery of the second substrate 2. When the thermosetting adhesive is used, after placing the first substrate 1 on the second substrate 2 with the adhesive, a baking treatment is carried out in an oven for 30 minutes to 2 hours at temperatures of 130° C. to 160° C. with a pressure of 1.0 to 2.0 kg/cm$^2$ to harden it.

Next, the antiferroelectric liquid crystal 3 is filled in the gap between the first substrate 1 and the second substrate 2, and the hole used for the filling of the antiferroelectric liquid crystal 3 is sealed to form an antiferroelectric liquid crystal panel 10.

On the outside of the first substrate 1 and the second substrate 2 of the antiferroelectric liquid crystal panel 10, polarizers 11 and 12 are disposed in a manner that each polarizing axis intersects at right angles to form a liquid crystal display panel.

The operating principle of the liquid crystal display panel formed with the antiferroelectric liquid crystal panel 10 combined with the polarizers 11 and 12 is the same as the conventional example described above, so further explanation will be omitted. In this example, each intersecting portion of the plural first transparent electrodes 4 and second transparent electrodes 5, serves as a display pixel.

Here, the cross-shaped spacer 6 will be explained in detail with reference to FIG. 5 and FIG. 6.

Figure 6:
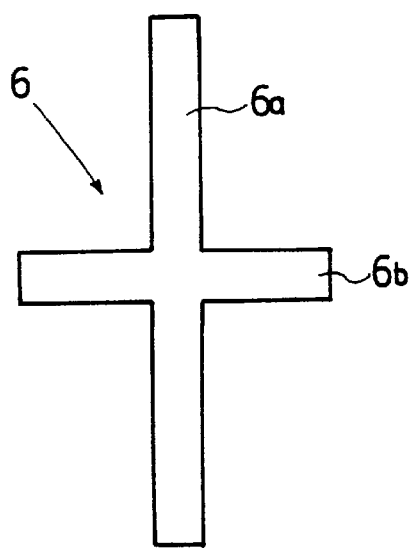
FIG. 6 is a plan view of the cross-shaped spacers 6 in FIG. 1.

A cross-shaped spacer 6 is formed in a manner such that a longitudinal side portion 6a having a thickness of approximately 1.7 µm, and a width of approximately 10 µm, intersects with a lateral side portion 6b at right angles to form a cross shape as shown in FIG. 5 and FIG. 6. Incidentally, in FIG. 5, the thickness of the spacer 6 is shown in an extensively enlarged manner for the convenience of the illustration.

The longitudinal side portion 6a of each spacer 6 is positioned in a first space S1 between neighboring first transparent electrodes 4 and 4, the lateral side portion 6b is positioned corresponding to a second space S2 between adjacent second transparent electrodes 5 and 5, and an intersecting portion 6c of the longitudinal side portion 6a and the lateral side portion 6b is positioned to correspond to an intersecting portion of the space S1 and the space S2.

Therefore, the longitudinal side portion 6a and the lateral side portion 6b of the spacer 6 are formed in a manner such that the longitudinal side portion 6a and the lateral side portion 6b of the spacer 6 surround a display pixel 17 from four corner portions of the display pixel 17 which comprises each intersecting portion of the first transparent electrodes 4 and the second transparent electrodes 5.

Though the cross-shaped spacer 6 is of a very fine structure, it is easily fabricated by means of a photolithography process using a photoresist.

Now, one of the methods of fabricating the spacers 6 is explained below.

First, acrylic negative photoresist (for instance, JNPC-43—Trade name, manufactured by Japan Synthetic Rubber Co., Ltd.) is coated on an electrode forming surface of the first substrate 1 to cover each first transparent electrodes 4 by a spin coater at 550 to 650 rpm and is prebaked in an oven for approximately one minute at 80° C., thereby forming a photoresist film having a thickness of about 1.7 µm.

Next, a photo mask having a pattern corresponding to the arrangement of plural cross-shaped spacers 6 is placed on the photoresist film on the first substrate 1, and is exposed to light having a wavelength of 360 nm by an aligner.

The first substrate 1 is immersed in a developer (for instance, MF-312—Trade name, manufactured by Shipley Microelectronics, Ltd.) to remove the portion of the photoresist which is not exposed to the light. Then the first substrate 1 is kept in an oven at temperatures of 190° C. to 200° C. in a nitrogen atmosphere to carry out postbaking.

Through the above steps, a number of cross-shaped spacers 6 as shown in FIG. 5 can be easily formed on the first substrate 1 in a fixed state.

Next, a method for fabricating the first and second alignment layers 7 and 8 shown in FIG. 1 is explained.

On the first substrate 1, the first alignment layer 7 is formed to cover the spacers 6 and each transparent electrode 4, and on the second substrate 2, the second alignment layer 8 is formed to cover each transparent electrode 5.

The alignment layers 7 and 8 are fabricated in a manner such that a resin film made of polyimide (solvent evaporation type) or polyamic acid (reaction type) is coated on the substrates 1 and 2 with a printing press. After heating for one hour at temperatures of 200° C. to 250° C. to cure it, an aligning treatment is carried out by a rubbing process. When a polyimide film is formed as an alignment layer, for instance, RN-1024 (Trade name, manufactured by Nissan Chemical Industries, Ltd.) or JIF (Trade name, manufactured by Japan Synthetic Rubber Co., Ltd.) is used, and when a polyamic acid film is formed as an alignment layer, for instance, RN-1102 (Trade name, manufactured by Nissan Chemical Industries, Ltd.) is used.

Figure 7:
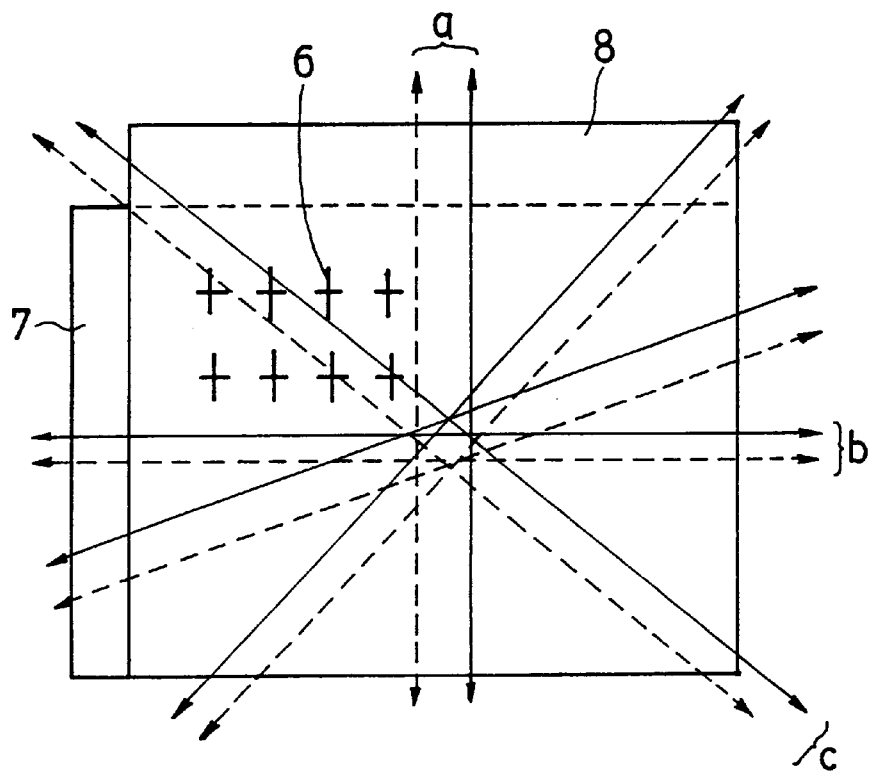
FIG. 7 is an illustrative view explaining the directions of aligning treatment for the first and the second alignment layers 7 and 8 in FIG. 1.
Figure 8:
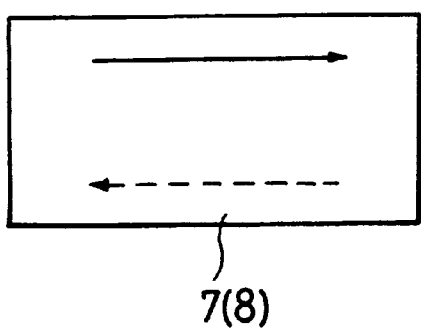
FIG. 8 is a view showing another example explaining the directions of the aligning treatment, in which a symbol shows a parallel rubbing direction and a symbol (B) shows an antiparallel rubbing direction.
Figure 8:
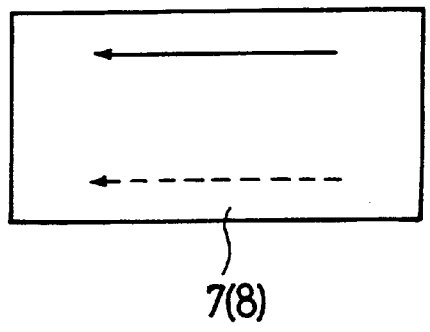

The aligning treatment is carried out by rubbing with a brush roller on each alignment layer 7 and 8. The direction of the aligning treatment can be optional as shown in FIG. 7 illustrating the alignment direction of the first alignment layer 7 by a dotted line with an arrow and illustrating the alignment direction of the second alignment layer 8 by a solid line with an arrow. However, it is preferable to carry out the treatment in either a direction a parallel to the longitudinal side portion 6a or a direction b parallel to the lateral direction 6b in consideration of the positional relationship of the cross-shaped spacers 6.

It is possible to carry out the aligning treatment in directions other than the directions a or b shown in FIG. 7, but when the aligning treatment is carried out, for instance, in a direction slanting at an angle of 45 degrees to the longitudinal side portion 6a, like direction c, a portion where the aligning treatment by the brush roller around the intersecting portion 6c of the spacer 6 cannot be carried out becomes larger, so directions other than the direction a or b are not preferable because alignment defects could easily be created, especially defects in the pixels.

On the other hand, when the aligning treatment is carried out in the direction a or b in FIG. 7, since any alignment defect is created along the longitudinal side portion 6a or the lateral side portion 6b of the spacer 6, the possibility of creating an alignment defect in any of the pixels is small. Accordingly, the influence on the display will be small.

It is noted that the aligning treatment is required to be carried out in a direction parallel to each other for the alignment layers 7 and 8 as shown by the dashed line and solid line in FIG. 7. As shown in FIG. 8(A), when the directions (direction to move the brush roller in a forward turn) are the same, it is called parallel rubbing and the directions of pretilt with respect to the liquid crystal molecules are the same. On the contrary as shown in FIG. 8(B), when the directions are opposite to each other, it is called an antiparallel rubbing, and the direction of pretilt with respect to the liquid crystal molecules are opposite.

The antiferroelectric liquid crystal takes on an antiparallel alignment when the alignment layer 7 and 8 are treated with parallel rubbing as shown in FIG. 8(A), while with an antiparallel rubbing shown in FIG. 8(B), it takes on a parallel alignment.

Since the antiferroelectric liquid crystal panel 10 has the above-described structure, the spacer 6 having a cross-shaped plane is fixed to the first substrate on a position corresponding to the intersecting portion of a first space between the adjacent first transparent electrodes 4 and 4, and a second space between the adjacent second transparent electrodes 5 and 5. In other words, from the four corners of each display pixel portion 17 which comprises an intersecting portion of the first transparent electrodes 4 and the second transparent electrodes 5 shown in FIG. 5, so as to surround the periphery.

Consequently, the gap between the first substrate 1 and the second substrate 2 is defined by the height (approximately 1.7 $\mu$m) of the spacer 6 and the height is maintained constant.

Since the spacer 6 is provided in the gap between the adjacent display pixel portions 17, no void is created in the display pixel portions 17 by the spacer 6 itself. And since the spacer 6 is fixed on the first substrate 1, there is no fear of movement caused by vibration and the like. Therefore there is no fear of causing alignment failure due to damaging the alignment layers 7 and 8, as the conventional silica bead causes.

Further, since the cross-shaped spacer 6 is fixed on the first substrate 1, it has a structure that the opposing first and second substrates 1 and 2 do not deform to the outside or to the inside of the panels. Therefore, vibration of the first and the second substrates 1 and 2 caused by resonance with the driving frequency of the antiferroelectric liquid crystal is restrained and creation of disorder in the alignment caused by destruction of layer structure of the antiferroelectric liquid crystal 3 is prevented.

Thus, the antiferroelectric liquid crystal panel 10 experiences no destruction of the layer structure which is peculiar to the antiferroelectric liquid crystal, and no damage of the alignment layer, and is always able to normally control the alignment of the liquid crystal molecules, which results in a panel having a superior display quality and excellent reliability when used as a liquid crystal panel. Further, since there is no fear of destruction of the layer structure of the antiferroelectric liquid crystal 3 caused by pressure from the outside of the panel, it can be used for a touch panel.

Figure 2:
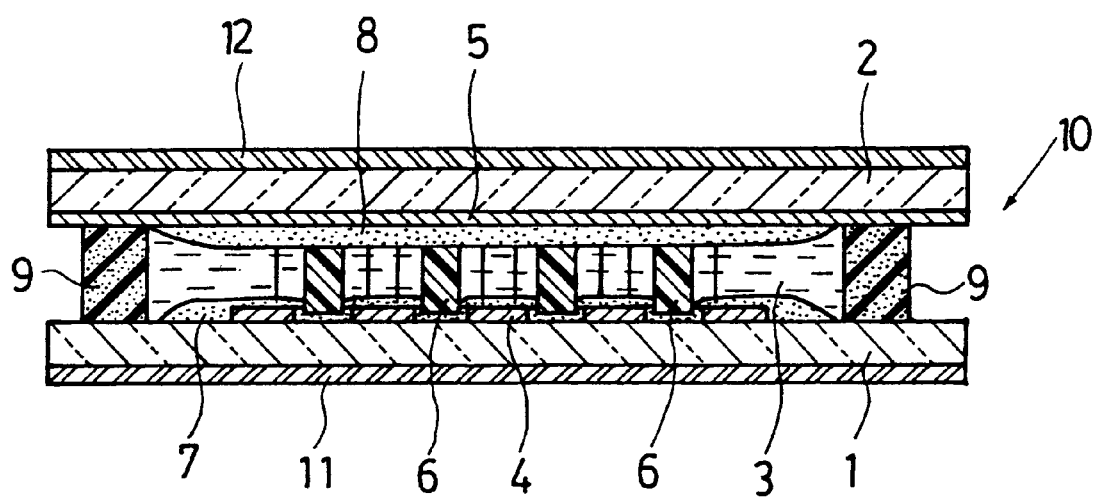

Second Embodiment: FIG. 2

Next, the second embodiment of the antiferroelectric liquid crystal panel according to the present invention will be explained with reference to FIG. 2.

In FIG. 2, the same reference numerals are used for portions corresponding to the portions in FIG. 1, and points of difference between the first embodiment and this embodiment will be explained and the common points are omitted from the detailed explanations.

An antiferroelectric liquid crystal panel 10 is provided with a plurality of strip-shaped first transparent electrodes 4 and a plurality of strip-shaped second transparent electrodes 5 each at predetermined intervals in parallel on a first substrate 1 and a second substrate 2, respectively. The first transparent electrodes 4 and the second transparent electrodes 5 are opposedly disposed to intersect with each other, and the first substrate 1 and the second substrate 2 are bonded with a sealing agent 9 to fill an antiferroelectric liquid crystal 3 in the gap therebetween. An alignment layer 8 is formed on the second substrate so as to cover the second transparent electrodes 5. These points are in common with the first embodiment.

What is different from the first embodiment is that a first alignment layer 7 is formed on the first substrate 1 so as to cover the first transparent electrodes 4, and after the aligning treatment is conducted on the surface, cross-shaped spacers 6 are formed at a position similar to the case of the first embodiment.

The first alignment layer 7 is formed so as to cover only the transparent electrodes 4 without covering the spacers 6. Accordingly, after a resin similar to the resin in the first embodiment is coated on the first substrate 1 so as to cover the transparent electrodes 4, the first alignment layer 7 is formed through baking and hardening. Then, the alignment treatment is conducted by rubbing with a brush roller on the entire surface of the alignment layer 7.

The cross-shaped spacer 6 is formed in the following manner. A negative-type photosensitive resin is coated to cover an alignment layer 7 on the entire surface of the first substrate 1 on which the first alignment layer 7 is formed and treated for alignment, and the whole system is prebaked. Then, a photo mask on which a plane pattern of the spacers 6 is formed is placed upon the above-described first substrate. After exposure and development, unexposed portions of the photosensitive resin are removed to obtain the cross-shaped spacers 6. Thus, plural spacers 6 which have a similar shape, size and layout to the first embodiment can be fixed on the first substrate 1.

In the antiferroelectric liquid crystal panel of the present embodiment, when an aligning treatment is carried out on the first alignment layer 7, a rubbing treatment can be conducted on the entire surface of a substantially flat alignment layer 7 which has no cross-shaped spacer 6. Accordingly, the present embodiment has an advantage that alignment defects appear less when compared with the first embodiment. However, by the development to pattern the spacers 6, there arises some possibility of lowering the alignment accuracy given to the alignment layer 7. Since other aspects are similar to the first embodiment, the explanation will be omitted.

Figure 3:
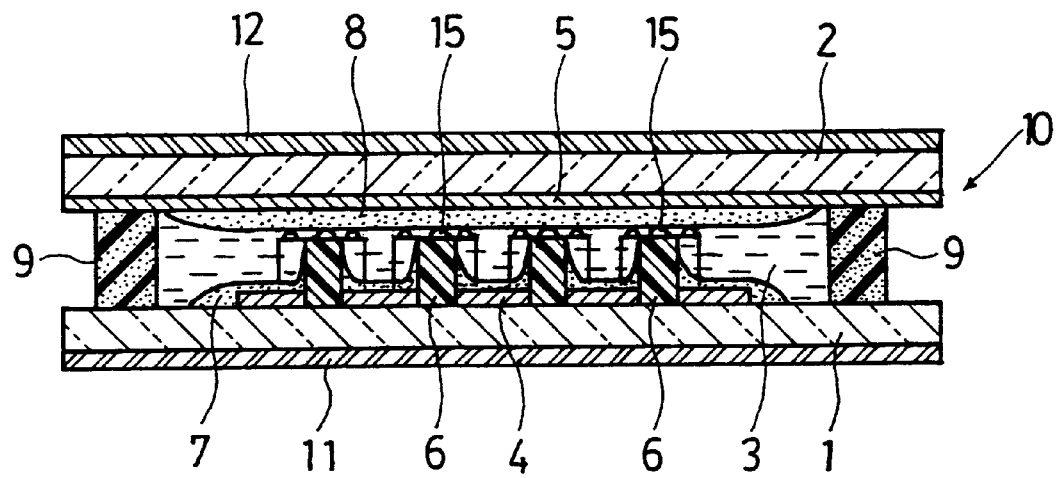
Figure 9:
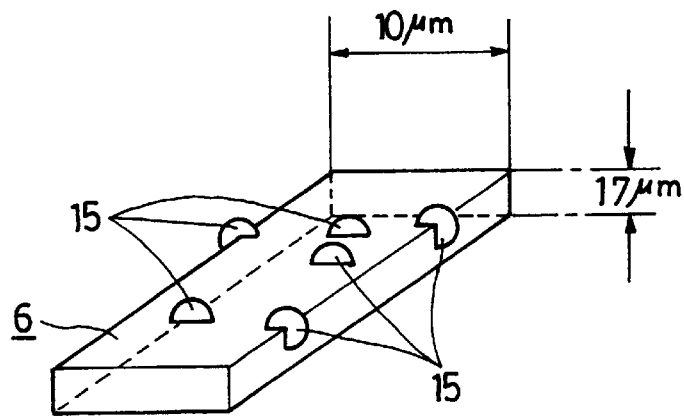
FIG. 9 is an enlarged perspective view showing the adhering state of silica beads 15 with adhesive to the spacers 6 in FIGS. 3 and 4.
Figure 10:
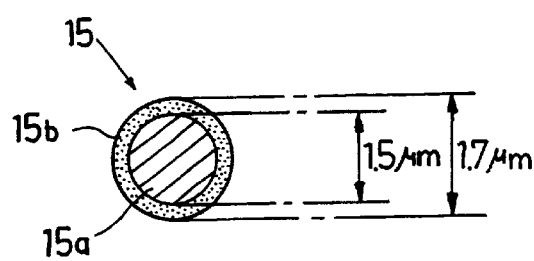
FIG. 10 is a sectional view of the silica bead with adhesive shown in FIG. 9.

Third Embodiment: FIG. 3, FIG. 9, and FIG. 10

Next, the third embodiment of the antiferroelectric liquid crystal panel according to the present invention will be explained with reference to FIG. 3, FIG. 9 and FIG. 10.

In FIG. 3, the same reference numerals are used for portions corresponding to the portions in FIG. 1, and points of difference between the first embodiment and this embodiment will be mainly explained and the common points are omitted from detailed explanations.

In the antiferroelectric liquid crystal panel 10 according to the third embodiment, a point of difference from the antiferroelectric liquid crystal display panel of the first embodiment shown in FIG. 1 is that silica beads with adhesive 15 are adhered and buried in the cross-shaped spacer 6. The upper portion of the spacer 6 is adhered on the alignment layer 8 of the second substrate 2 by the adhesive of the silica beads with adhesive 15.

In FIG. 3, since the size of the height of the spacer 6 is shown in an extremely enlarged manner, the diameter of the silica bead with adhesive 15 is shown in a much smaller size compared with the height of the spacer 6. But actually, a number of silica beads with adhesive 15 having a diameter of about 1.7 μm (substantially the same as the height of the spacer 6) adhere to the spacer 6 having a width of 10 μm and a height of 1.7 μm, shown as a portion of the spacer 6 to which the silica beads with adhesive 15 adhere in an enlarged manner in FIG. 9.

The silica bead with adhesive 15 is such that an epoxy adhesive 15b is coated in a thickness of about 0.1 μm on the surface of the spherical shape silica bead 15a having a high density (1.5 μm in diameter) as is shown in FIG. 10 to form a spherical body having a diameter of about 1.7 μm.

The cross-shaped spacer 6 adhered with the silica beads with adhesive 15 is formed as follows.

First, similar to the case in the first embodiment, prebaking is carried out after a negative photoresist is coated on the first substrate 1.

Next, the silica beads with adhesive 15 are scattered on the surface of the photoresist film in a density in the range of 300 pcs/mm² to 1200 pcs/mm² with a dry spacer spreader, so that a photoresist film on which is located numerous silica beads with adhesive uniformly adhered can be obtained.

In order to conform the silica beads with adhesive 15 on the photoresist, the substrate is kept horizontal for ten minutes and press-cured at a temperature of 80° C. for one minute in an oven.

Similar to the case in the first embodiment, a photomask on which a plane arrangement pattern of many cross-shaped spacers is formed is put on a photoresist film. After exposure and development, the unexposed portion of the photoresist with silica beads with adhesive 15 adhered thereto is removed.

The first substrate 1 thus obtained is put into an oven in a nitrogen atmosphere at 120° C. for one hour for postbaking. Caution should be taken not to overheat to more than 150° C. because the epoxy adhesive 15b of the silica bead with adhesive 15 shown in FIG. 10 melts.

Since the silica bead with adhesive 15 of the cross-shaped spacer 6 thus formed has a diameter substantially equal to the thickness of the spacer 6, it is not usually buried in the spacer 6 and a portion of the bead protrudes on the upper surface of the spacer 6 as shown in FIG. 9.

Subsequently, the second substrate 2 is put on top of the first substrate 1 and bonded together with the sealing agent 9, the epoxy adhesive 15b coated on the surface of the silica beads with adhesive 15 contacts at a point on the second alignment layer 8 of the second substrate 2.

Taking the vertical relationship between the first substrate 1 and the second substrate 2 opposite to that in relation to FIG. 3 so that the first substrate 1 is placed upward, they are put into an oven at a temperature in the range of 130° C. to 160° C. for 30 minutes to 2 hours to cure the sealing agent 9.

The epoxy adhesive 15b which is coated on the surface of each silica bead with adhesive 15 then melts and falls down due to gravity, and the beads gather at a point of contact with the alignment layer 8 on the second substrate 2. Therefore, a tip of the spacer 6 and the second substrate 2 can be firmly bonded with the adhesive.

According to the present embodiment, since the cross-shaped spacer 6 can be fixed on the second substrate 2 by the silica beads with adhesive 15, the rigidity of the first and the second substrate 1 and 2 is enhanced and the protection capability for not destroying the layer structure of the antiferroelectric liquid crystal 3 can be improved more than in the case of the aforementioned embodiments. Since other points are the same as in the first embodiment, explanations thereof are here omitted.

Figure 4:
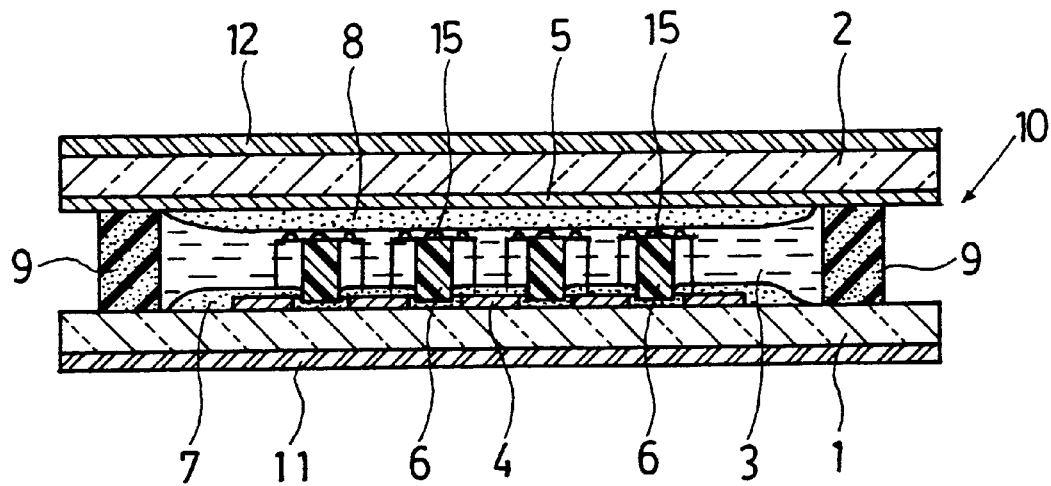

Fourth Embodiment: FIG. 4

The fourth embodiment of an antiferroelectric liquid crystal panel according to the present invention will be explained hereafter with reference to FIG. 4.

In FIG. 4, the same reference numerals are used for portions corresponding to the portions in FIG. 1 to FIG. 3, and points of difference between the third embodiment and this embodiment will be explained and the common points are omitted from detailed explanations.

In an antiferroelectric liquid crystal panel 10 according to the fourth embodiment, a point of difference from the third embodiment shown in FIG. 3 is that a first alignment layer 7 on the side of the first substrate 1 is formed before forming spacers 6 in the same manner as in the second embodiment shown in FIG. 2, and after an aligning treatment is carried out on the entire surface, each spacer 6 adhered with silica beads with adhesive 15 is formed. Consequently a first alignment layer 7 is not formed on the surface of the spacer 6.

A method to form the spacer 6 adhered with the silica beads with adhesive 15 on the first substrate 1 is such that the first alignment layer 7 is formed on the first substrate 1 and after the aligning treatment is carried out, a negative photoresist is coated on the alignment layer 7 and the silica beads with adhesive 15 are scattered thereon. Other steps to form the spacers 6 are the same as in the case of the third embodiment.

The point is that the spacer 6 is fixed on the second substrate by the epoxy adhesive 15b (FIG. 10) on the surface of the silica beads with adhesive 15, and the effects thereof are the same as in the third embodiment.

Other embodiments

Figure 11:
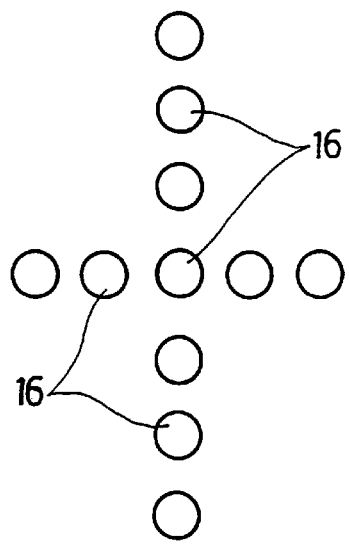
FIG. 11 is a plan view showing another shape and layout example of the spacers provided in the antiferroelectric liquid crystal panel according to the present invention.
Figure 12:
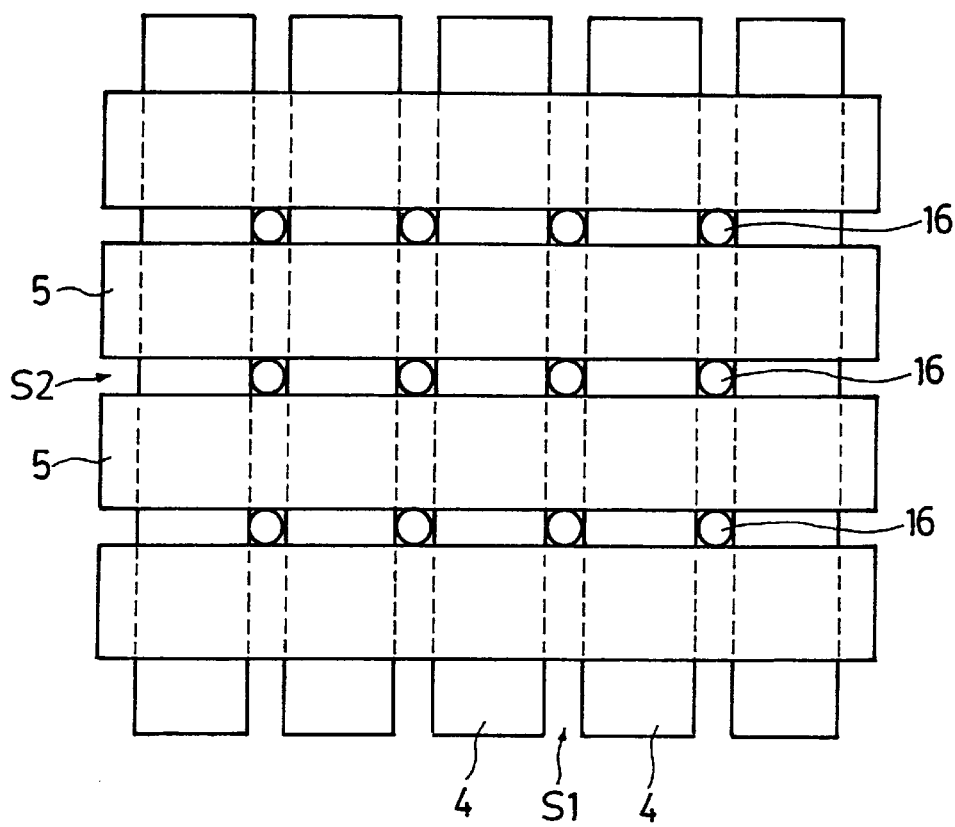
FIG. 12 is a plan view showing still another layout example of the spacers provided in the antiferroelectric liquid crystal panel according to the present invention together with the first and second transparent electrodes.
Figure 13:
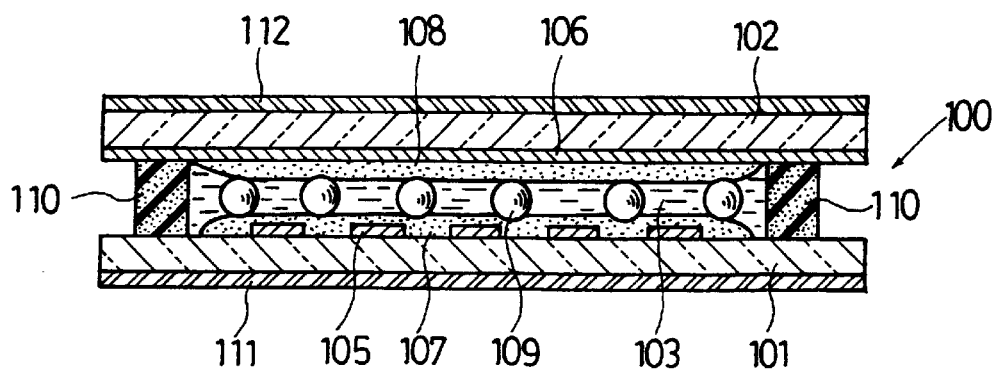
FIG. 13 is a schematic sectional view showing the structure of the conventional a ferroelectric liquid crystal panel.

In the above embodiments, spacers 6 having a cross-shaped plane are formed as spacers, but plural spacer portions can be formed by arranging small-sized cylindrical spacers 16 in a cross shape as shown in FIG. 11. Or as shown in FIG. 12, small-sized cylindrical spacers 16 can be scattered on the positions corresponding to the intersecting portions of at least spaces SI between adjacent first transparent electrodes 4, 4 with spaces S2 between adjacent second transparent electrodes 5, 5. Needless to say, spacers 16 can be provided on the positions corresponding to a place excepting the intersecting portions of the spaces Si and the spaces S2.

For instance, when a space between transparent electrodes is 10 μm and the width of a black matrix made of chromium and the like to cover the interval is 12 μm, the diameter of the cylindrical spacers 16 is set to be about 10 μm.

The plane shape of the spacer is not limited to the cross shape or a circular, but can also include a polygon, a rectangle, or the shape of the letter T or L.

As such spacers, an example using an acrylic negative resin is explained, but a positive-type photoresist can be used. When a positive-type photoresist is used, however, the developer may damage the alignment. Therefore, it is preferable to use a negative-type photoresist. When an alignment layer is formed after the spacers are formed in the same manner as in the first and the third embodiments, the positive-type photoresist can be used because there is no fear of damage to the alignment layer by the developer.

It should be noted that when a photosensitive resin is used, a number of fine spacers can be easily patterned by carrying out an exposure and development treatment to the photoresist film coated on the entire surface of the first substrate. But when an etching process or the like is adopted, an insulating material other than photosensitive resin can be used.

Effect of the Invention

As described above, the antiferroelectric liquid crystal panel according to the present invention is provided with spacers made of insulating material fixed on the first substrate 1 at the positions corresponding to the intersecting portions of at least the first spaces between adjacent first transparent electrodes and the second spaces between adjacent second transparent electrodes. Therefore, the gap between the first substrate 1 and the second substrate 2 is defined by the height of the spacer and is maintained constant.

When the antiferroelectric liquid crystal panel is used for a liquid crystal display panel, a spacer is to be provided in a gap between the adjacent display pixels, and it is covered by a black matrix, so that a void caused by the spacer itself is not created at the display pixel portion. Since the spacer is fixed on the first substrate, there is no fear of moving caused by vibration. Therefore, there is no fear of causing an alignment failure due to damage on the alignment layer as with the conventional silica beads.

Since the spacer is fixed at least on the first substrate, it has a structure in which the opposing first and second substrates are hard to deform to the outside or inside of the panel. Vibration caused by resonance of the first and second substrate with the driving frequency of the antiferroelectric liquid crystal is restrained, and disorder of alignment caused by destruction of the layer structure of the antiferroelectric liquid crystal is prevented by pressure from the outside of the panel.

Since alignment of the liquid crystal molecules is always normally controlled without destruction of the layer structure characteristic of the antiferroelectric liquid crystal or damage to the alignment layer by external pressure, a panel having a high display quality and high reliability can be obtained when it is used as a liquid crystal display panel.

Since there is no fear of destroying the layer structure of the antiferroelectric liquid crystal caused by an external pressure of the panel, it can be used as a touch panel.

Such an effect can be enhanced by forming the spacer in a cross shape, and by adhering silica beads with adhesive on the spacer so that the spacer can adhere to the second substrate with the adhesive.

What is claimed is:

1. An antiferroelectric liquid crystal panel in which a first substrate having a plurality of first transparent electrodes in a strip shape and a second substrate having a plurality of second transparent electrodes in a strip shape are oppesedly disposed with a small gap therebetween so that the first transparent electrodes and the second transparent electrodes face and intersect with each other at substantially right angles and an antiferroelectric liquid crystal is filled in the gap, said antiferroelectric liquid crystal panel comprising:
   spacers made of an insulating material and fixed on said first substrate, which have a cross shape or the shape of the letter T or L and are provided independently at least at positions corresponding to each intersecting portion of first spaces between said first transparent electrodes and second spaces between said second transparent electrodes,
   a first alignment layer formed on said first substrate to cover at least said first transparent electrodes; and
   a second alignment layer formed on said second substrate to cover said second transparent electrodes.

2. The antiferroelectric liquid crystal panel according to claim 1, wherein said first alignment layer is also formed on the surface of said spacers.

3. The antiferroelectric liquid crystal panel according to claim 1, wherein said spacer is formed of a photoresist.

4. The antiferroelectric liquid crystal panel according to claim 2, wherein said spacer is formed of a photoresist.

5. The antiferroelectric liquid crystal panel according to claim 1, further comprising silica beads with adhesive adhered to said spacer, and said spacer and said second substrate are bonded with the adhesive.

6. The antiferroelectric liquid crystal panel according to claim 2, further comprising silica beads with adhesive adhered to said spacer, and said spacer and said second substrate are bonded with the adhesive.

7. The antiferroelectric liquid crystal panel according to claim 3, further comprising silica beads with adhesive adhered to said spacer, and said spacer and said second substrate are bonded with the adhesive.

8. The antiferroelectric liquid crystal panel according to claim 4, further comprising silica beads with adhesive adhered to said spacer, and said spacer and said second substrate are bonded with the adhesive.

9. The antiferroelectric liquid crystal panel according to claim 1, wherein said spacer has a cross-shaped plane in which a longer side intersects with a shorter side at right angles at a portion corresponding to an intersecting portion of the first space between said first transparent electrodes and the second space between said second transparent electrodes.

10. The antiferroelectric liquid crystal panel according to claim 2, wherein said spacer has a cross-shaped plane in which a longer side intersects with a shorter side at right angles at a portion corresponding to an intersecting portion of the first space between said first transparent electrodes and the second space between said second transparent electrodes.

11. The antiferroelectric liquid crystal panel according to claim 5, wherein said spacer is formed in a cross-shaped plane in which a longer side intersects with a shorter side at right angles at a portion corresponding to an intersecting portion of the first space between said first transparent electrodes and the second space between said second transparent electrodes.

12. The antiferroelectric liquid crystal panel according to claim 5, wherein said spacer is formed in a cross-shaped plane in which a longer side intersects with a shorter side at right angles at a portion corresponding to an intersecting portion of the first space between said first transparent electrodes and the second space between said second transparent electrodes.

13. The antiferroelectric liquid crystal panel according to claim 9, wherein said first alignment layer and said second alignment layer are subjected to an alignment treatment in a direction substantially parallel to either of the longer side or shorter side of said cross-shaped spacer.

14. The antiferroelectric liquid crystal panel according to claim 10, wherein said first alignment layer and said second alignment layer are subjected to an alignment treatment in a direction substantially parallel to either of the longer side or shorter side of said cross-shaped spacer.

15. The antiferroelectric liquid crystal panel according to claim 11, wherein said first alignment layer and said second alignment layer are subjected to an alignment treatment in a direction substantially parallel to either of the longer side or shorter side of said cross-shaped spacer.

16. The antiferroelectric liquid crystal panel according to claim 12, wherein said first alignment layer and said second alignment layer are subjected to an alignment treatment in a direction substantially parallel to either of the longer side or shorter side of said cross-shaped spacer.

17. The antiferroelectric liquid crystal panel according to claim 1, wherein said spacer is scattered on the position corresponding to each of said spaces including at least an intersecting portion of the first spaces between said first transparent electrodes with the second spaces between said second transparent electrodes.

18. The antiferroelectric liquid crystal panel according to claim 2, wherein said spacer is scattered on the portion corresponding to each of said spaces including at least an intersecting position of the first spaces between said first transparent electrodes with the second spaces between said second transparent electrodes.

19. The antiferroelectric liquid crystal panel according to claim 5, wherein said spacer is scattered on the portion corresponding to each of said spaces including at least an intersecting position of the first space between said first transparent electrodes with the second space between said second transparent electrodes.

20. The antiferroelectric liquid crystal panel according to claim 6, wherein said spacer is scattered on the position corresponding to each of said spaces including at least an intersecting portion of the first space between said first transparent electrodes with the second space between said second transparent electrodes.

21. The antiferroelectric liquid crystal panel according to claim 1, wherein said first alignment layer is formed between the spacers and the first substrate.

* * * * *